United States Patent Office 3,300,718
Patented Jan. 24, 1967

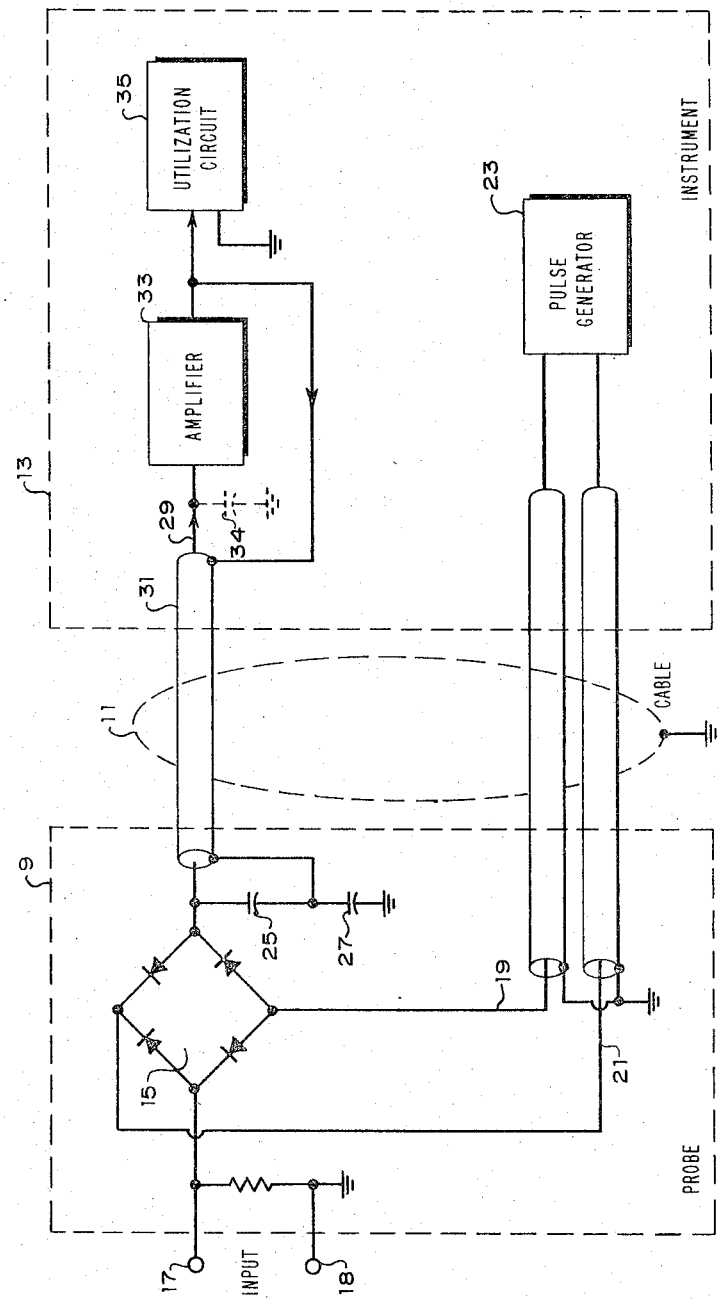

3,300,718
TEST PROBE APPARATUS EMPLOYING FEED-
BACK REDUCTION OF THE DISTRIBUTED
CAPACITANCE OF THE SIGNAL CABLE
James M. Umphrey, Mountain View, Calif., assignor to
Hewlett-Packard Company, Palo Alto, Calif., a corporation of California
Filed Aug. 12, 1963, Ser. No. 301,321
5 Claims. (Cl. 324—72.5)

This invention relates to signal testing probes of the type used in sampling oscilloscopes.

A testing probe is usually connected to a remote electronic instrument using a flexible cable to facilitate freedom of movement about a circuit under test. The testing probe of a sampling oscilloscope produces sample pulses of the signal under examination which are transmitted to the oscilloscope over a length of coaxial cable. A cable of convenient length usually shows high distributed capacity between its inner and outer conductors. As a result, a sample pulse of short duration taken of a low level signal has insufficient electrical charge available to charge up the capicity of the cable with any appreciable voltage across the conductors. To overcome this effect an amplifier is usually provided in the testing probe to amplify the sample pulses and to drive the distributed capacity of the connecting cable. Apparatus of this type has the disadvantage that the physical size of the probe must be made sufficiently large to house the amplifier. Also additional power must be supplied through the connecting cable to the amplifier, thereby producing undesirable heating of the probe.

Accordingly, it is an object of the present invention to provide apparatus for minimizing the effect of the distributed capacity of a length of cable upon a signal applied at one end of the cable.

It is another object of the present invention to provide a signal testing probe which obviates the need for a gain element in the probe and which minimizes the effect produced by a length of cable having appreciable distributed capacity upon signals supplied by the probe.

In accordance with the illustrated embodiment of the present invention a conductor and a shield therefor connect a signal testing probe to a remote electronic instrument. Signal applied to the conductor at the probe end is received by an amplifier in the instrument which drives the shield for the conductor in accordance with the signal received by the amplifier. This reduces the distributed capacity of the connecting cable because the conductor and the shield therefor are operated at substantially the same potential. Sample pulses applied to the cable from the testing probe are thus unaffected in transmission over the length of the cable. The amplifier and concomitant power dissipation in the testing probe are eliminated.

These and other objects of the present invention will be apparent from a reading of this specification and an inspection of the accompanying drawing which shows a schematic diagram of the probe of the present invention.

Referring now to the drawing there is shown a probe 9 connected by cable 11 to instrument 13. The probe 9 includes a normally nonconducting gate 15 which is connected through a pair of conductors 19 and 21 to the pulse generator 23 in the instrument 13. Pulses supplied by the pulse generator 23 render the normally nonconducting gate 15 momentarily conductive, thereby supplying charge from the signal at the input terminals 17 and 18 to the serially connected capacitors 25 and 27. The impedance of the combination of conductor 29 and shield 31 is very large compared with the impedance of capacitor 25 during the time the gate 15 is conductive. After the gate 15 is closed, a portion of the charge appearing on capacitor 25 travels down the length of conductor 29 and shield 31 to the input of amplifier 33. This amount of charge causes a voltage to develop across the stray capacity 34 at the input of the amplifier 33. This voltage is amplified and is applied to the shield 31 around conductor 29 and to utilization circuit 35. It can be seen that if the gain of amplifier 33 is substantially unity the capacity of conductor 29 with respect to shield 31 is reduced substantially to zero because no difference of potential exists between the two conductors. This has the effect of minimizing the potential across capacitor 25 which can thus no longer hold the charge due to the sampling pulse. As a result, this charge is "pumped" into the stray capacity 34 at the input of amplifier 33. This capacity may be made small by using a vacuum tube as the input element of the amplifier 33. A sample pulse applied to the cable is thus loaded by no more capacity than is present at the input electrode of a vacuum tube, irrespective of the length of the cable. This is substantially the same result as is obtained in conventional probes which include a vacuum tube amplifier in the probe for amplifying the sample pulse before it is applied to the cable. A probe connected according to the present invention however, has the advantage of requiring no power dissipating amplifier in the probe and hence can be physically smaller in size.

I claim:
1. Signalling apparatus comprising:
    an input for receiving an applied signal with respect to a reference potential;
    a storage capacitor and an impedance serially connected across said input;
    an amplifier having an input and an output;
    a pair of signal conductors having distributed capacitance therebetween, one of said conductors connecting said storage capacitor to the input of said amplifier for applying thereto the signal appearing on said storage capacitor with respect to the reference potential;
    said amplifier producing an output signal which is in phase with the signal applied to said input and which has an amplitude related to the amplitude of signal at the end of said one conductor connected to the input of said amplifier;
    means including the other of the signal conductors connecting the output of said amplifier to the common connection of the serially connected storage capacitor and impedance; and
    a utilization circuit connected to the output of said amplifier.
2. Signalling apparatus as in claim 1 wherein:
    said impedance includes another capacitor connected to form a capacitive signal divider from the input to said common connection.
3. Signalling apparatus as in claim 1 comprising:
    a signal probe including an input terminal and a terminal connected to said reference potential;
    a normally nonconductive gate connecting said input terminal and said one of the conductors; and
    means connected to said gate for rendering the gate momentarily conductive to apply to said series circuit including the storage capacitor a pulse having an amplitude related to the amplitude of signal with respect to the reference potential appearing at the input terminal of said probe.
4. Signalling apparatus as in claim 3 wherein:
    said means includes a pulse generator having a pair of outputs;
    first and second pairs of conductors, each pair forming an electromagnetic wave transmission line with corresponding ones of the conductors of the first and second pairs connected to the reference potential;

means including the other conductors of the first and second pairs of conductors connecting the pair of outputs of the pulse generator to the said gate for applying pulses of equal amplitude and opposite polarity to said gate to render the gate conductive for the duration of the applied pulses.

5. Signalling apparatus as in claim 4 wherein said pair of signal conductors and said first and second pairs of conductors are coaxial conductors;

said one and said other of the pair of signal conductors are respectively the inner and outer coaxial conductors; and said one and said other conductors of the first and second pairs of conductors are respectively the inner and outer coaxial conductors with the outer conductors of the first and second pairs of conductors connected to the reference potential at the signal probe ends thereof remote from the pulse generator.

References Cited by the Examiner
UNITED STATES PATENTS

| | | | |
|---|---|---|---|
| 2,795,654 | 6/1957 | Macdonald | 330—68 X |
| 3,229,212 | 1/1966 | Rogers | 324—72.5 X |

WALTER L. CARLSON, *Primary Examiner.*

E. L. STOLARUN, *Assistant Examiner.*